United States Patent [19]
Davis

[11] 4,222,373
[45] Sep. 16, 1980

[54] CERAMIC SOLAR COLLECTOR

[76] Inventor: Michael A. Davis, 3405 Greenfield Dr., Rocky Mount, N.C. 27801

[21] Appl. No.: 819,008

[22] Filed: Jul. 26, 1977

[51] Int. Cl.$^2$ ............................................. F24J 3/02
[52] U.S. Cl. ................................. 126/448; 126/445; 126/450; 126/901; 428/408
[58] Field of Search ............... 126/270, 271, 448, 445, 126/450, 901; 165/DIG. 8; 428/402, 408; 60/200 A

[56] References Cited

U.S. PATENT DOCUMENTS

| | | | |
|---|---|---|---|
| 2,751,188 | 6/1956 | Rath | 60/200 A |
| 2,887,628 | 5/1959 | Zierdt | 165/DIG. 8 |
| 3,190,816 | 6/1965 | Adamec | 126/271 X |
| 3,279,931 | 10/1966 | Olcott | 106/39.7 |
| 4,024,853 | 5/1977 | Gordon | 126/271 |
| 4,026,268 | 5/1977 | Bartos et al. | 126/271 X |
| 4,046,135 | 9/1977 | Root et al. | 126/271 X |

FOREIGN PATENT DOCUMENTS 762759  9/1934  France ...................... 126/271

OTHER PUBLICATIONS

Geller, Material Digest, A Survey of Ceramics for Nuclear Reactors, Oct. 1950, pp. 3–17.

Primary Examiner—Richard E. Gluck
Attorney, Agent, or Firm—Mills & Coats

[57] ABSTRACT

In abstract a preferred embodiment of this invention is a flat plate type solar collector constructed of specially prepared ceramic material and designed to give maximum heat exchange with either liquid or gaseous fluids.

7 Claims, 4 Drawing Figures

CERAMIC SOLAR COLLECTOR

This invention relates to energy converters and more particularly to solar energy collectors.

BACKGROUND OF THE INVENTION

Over the years various means have been devised to collect solar energy and to convert the same into thermal energy. One of the more typical forms of solar collectors is generally termed the flat plate collector and usually consists of a metal absorber plate painted black on the side facing the sun and thermally insulated on the sides and back thereof. Planely spaced above the absorber plate are usually one or more transparent glass or plastic covers to reduce heat loss in that direction. The thermal energy absorbed by the absorber plate or material is usually transferred to a working fluid (either liquid or gaseous) by circulating the same through tube like conduits that are either in thermal contact with or in close proximity to the absorber plate or material. The choice of materials for the absorber plate and working fluid tubes have up to now been dictated by the necessity for both a good thermal conductor and a material which is durable under normal exposure conditions of solar collecting. Usually either copper, aluminum or a combination of the two are used. The reason for these choices is, of course, that the metals are good thermal conductors and have reasonable durability.

Because of the relatively large expense associated with the metal tubing such as copper or aluminum, coupled with their relatively high thermal conductivity values (0.918 cal/cm/ sec/c and 0.480 cal/cm/sec/c, respectively) adequately efficient, although far from highly efficient, collectors have been built using relatively wide spacing between tubing channels.

The disadvantages of using metals or metal components in solar collectors is first the high cost of processing and fabricating metal, coupled with eventual oxidation, corrosion and some cases deterioration through electrolysis or galvanic action. Additionally, the cost consideration restricts the design of highly efficient collectors and the general nature of metals restrict the various forms which can be employed in the design of such collectors.

SUMMARY OF THE INVENTION

After much research and study into the above-mentioned problems, the present invention has been developed to provide a solar collector constructed of ceramic material which does not have the disadvantages of high cost of raw materials and fabrication techniques. The material of which the present invention is formed is adaptable to various complex shapes and provides wide flexibility in efficient design configurations. Additionally, the present invention has excellent durability and provides a simple, inexpensive and highly efficient collector.

Although ceramic materials are generally thought of as having poor conductive properties and in fact in many industries ceramic materials are used as insulators, through the use of additives greatly improved strength, thermal conductivity, thermal shock resistance, and light energy absorption and emissivity has been achieved in the present invention.

Further, because in the formed ceramic collector of the present invention, more tubes are spaced closer together and are disposed actually within the absorber plate itself, greater efficiency is obtained with the somewhat lower thermal conductivity of ceramic material becoming of negligible importance.

In view of the above, it is an object of the present invention to provide a ceramic type solar collector which is easily cast, extruded or press molded separately and placed together before firing.

Another object of the present invention is to provide a ceramic solar collector having integral tubes within the absorber plate itself.

Another object of the present invention is to provide a solar collector constructed in modules which can be fired and glazed prior to assembly into larger structures.

Another object of the present invention is to provide a ceramic solar collector wherein a plurality of modules are bonded together to form a larger unit.

Another object of the present invention is to provide in a ceramic solar collector a vitreious body to provide a sealed system for the working fluid.

Another object of the present invention is to provide a ceramic solar collector formed from either earthenware, stoneware, porcelain or glass melt composition as a basic ceramic material.

Another object of the present invention is to provide a ceramic solar collector having a cordierite body manufactured from a magnesium oxide-alumina-silica clay system.

Another object of the present invention is to provide a ceramic solar collector having a body manufactured from lithia aluminia silica clay system.

Another object of the present invention is to provide a ceramic solar collector having thermal conductive carbonaceous materials added to the ceramic material.

Another object of the present invention is to provide a ceramic solar collector which contains a graphite additive to increase thermal conductivity.

Another object of the present invention is to provide either Beryllium Oxide or Beryllium compounds as an additive to the ceramic materials to increase thermal conductivity in a ceramic solar collector.

Another object of the present invention is to provide a ceramic solar collector which has been glazed with a transparent glaze.

Another object of the present invention is to provide a ceramic solar collector having a black colored glaze thereon.

Another object of the present invention is to provide a ceramic solar collector having a body containing a dark colorant.

Another object of the present invention is to provide, in a ceramic solar collector, a glass foam insulation on the underside thereof.

Other objects and advantages of the present invention will become apparent and obvious from a study of the following description and the accompanying drawings which are merely illustrative of such invention.

DETAILED DESCRIPTION OF PREFERRED EMBODIMENT

With further reference to the drawings, the solar collector of the present invention, indicated generally at 11, is formed from a plurality of collector modules 12 and 12' and manifold modules 13.

Figure 1:
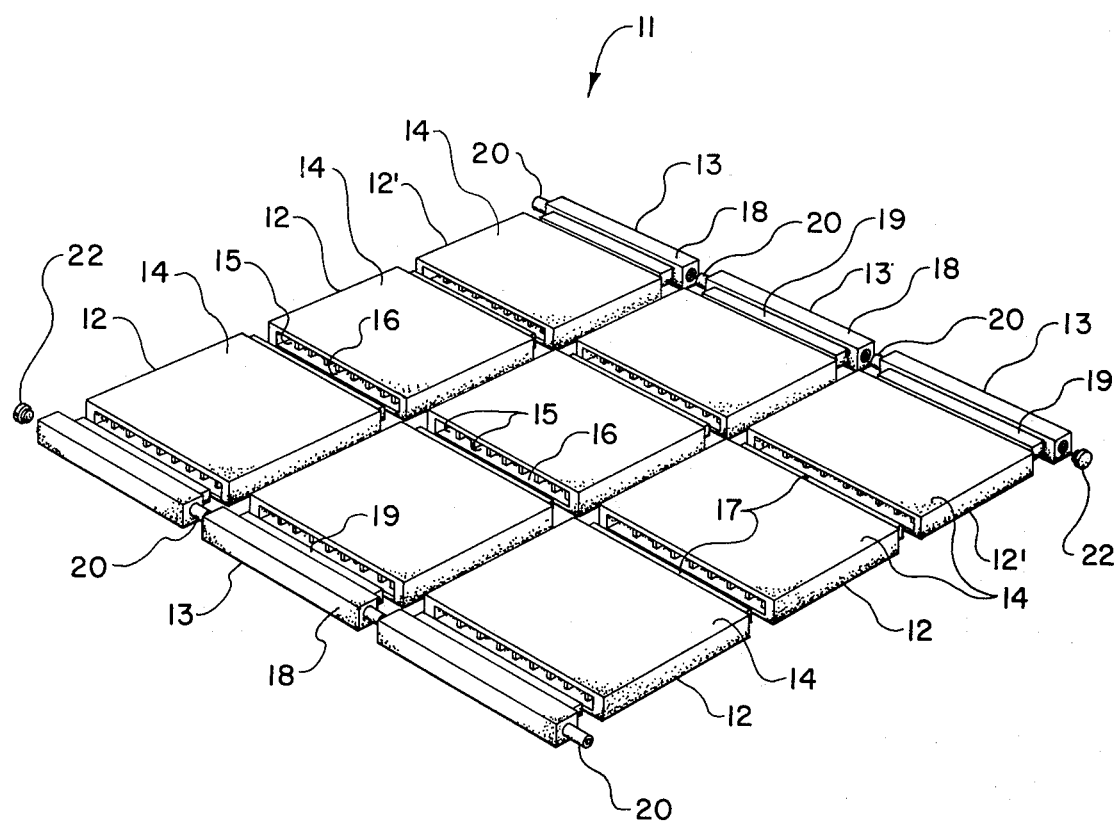
FIG. 1 is an exploded perspective view of the ceramic collector of the present invention showing the modular construction thereof.

As can be seen in FIG. 1, collector modules 12 have male-female mating configurations on opposite sides while collector modules 12' have a female-female mating configuration.

Figure 3:
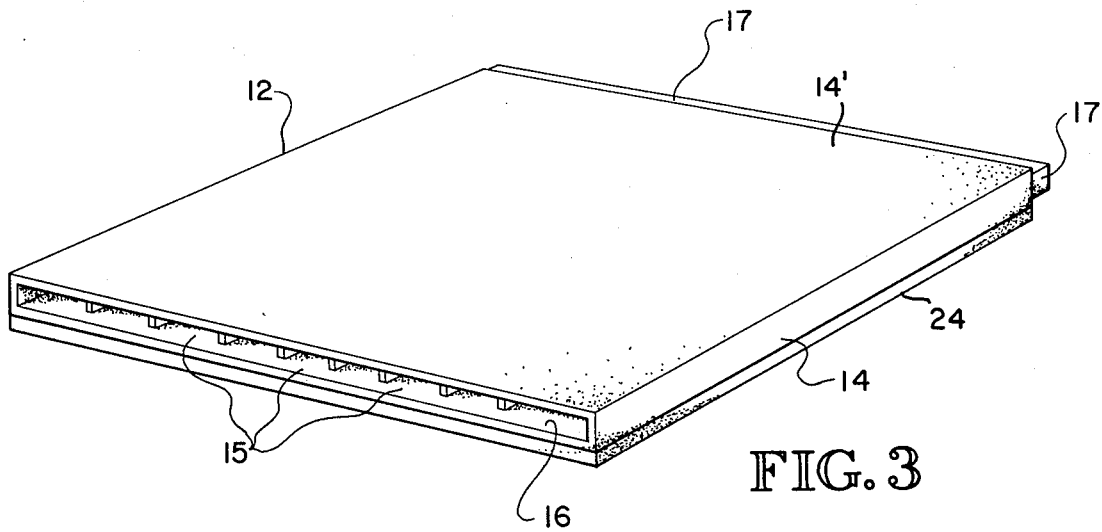
FIG. 3 is a perspective view of the opposite side of the module shown in FIG. 2.
Figure 2:
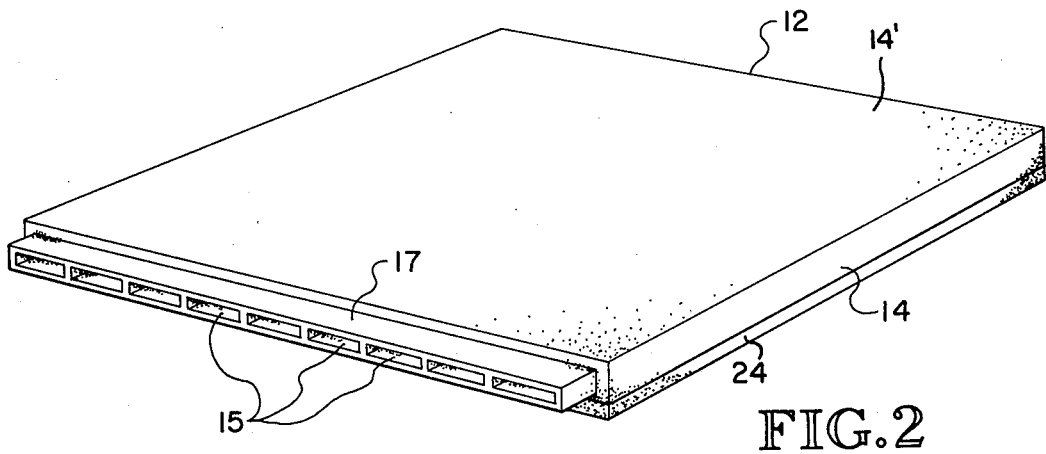
FIG. 2 is a perspective view of a typical male-female collector module.
Figure 4:
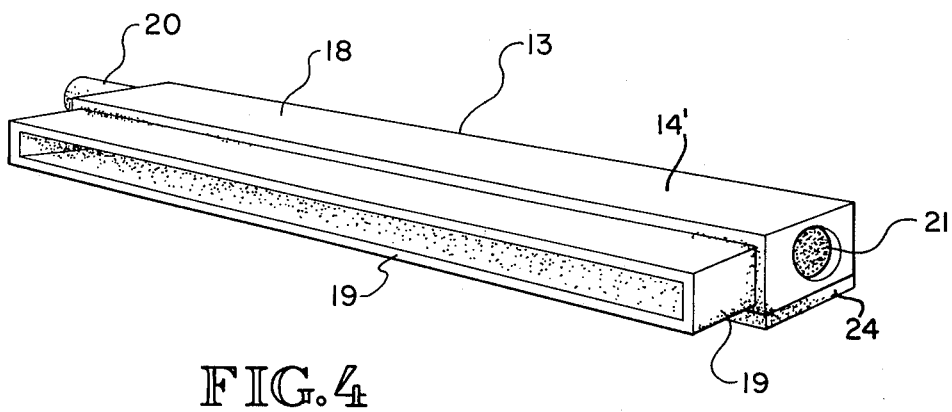
FIG. 4 is a perspective view of a typical manifold module.
Figure 5:
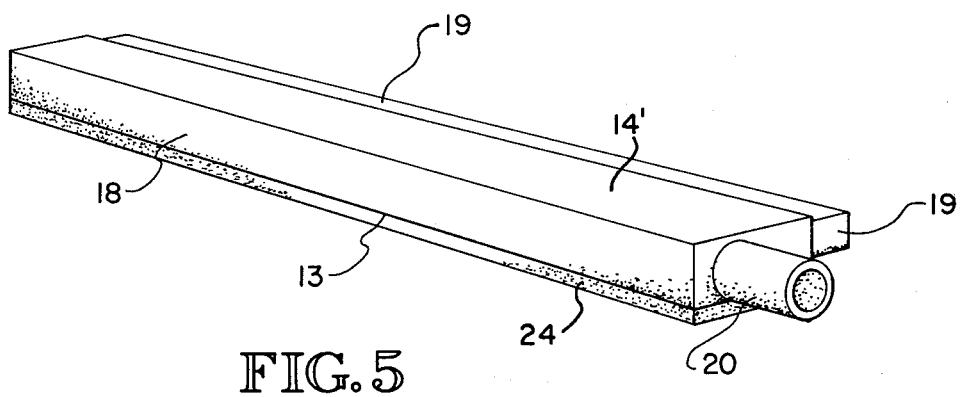
FIG. 5 is a perspective view of the opposite side of the manifold shown in FIG. 4.

More specifically, each of the collector modules 12 and 12' includes a module body 14 having a plurality of openings or channels 15 provided therein and a generally flat absorber surface 14'. The female portions of the collector modules is in the form of a recessed area 16 which can be seen particularly clear in FIG. 3. The male portion of the male-female collectors 12 is in the form of outwardly projecting tongue 17 which is so sized to fit within recess 16.

Each of the manifold modules 13 includes an elongated open body portion 18 and an outwardly projecting tongue portion 19 so sized to recessingly fit into female recess 16 of collector modules 12 or 12'. To facilitate forming, it should be noted that since body portion 18 is a manifold only, a single elongated opening is provided in tongue 19.

On one end of each of the manifold bodies 18 is provided a tube like member 20. This tube is adapted to be insertingly received by opening 21 provided in the opposite end of other like manifold modules 13.

Figure 6:
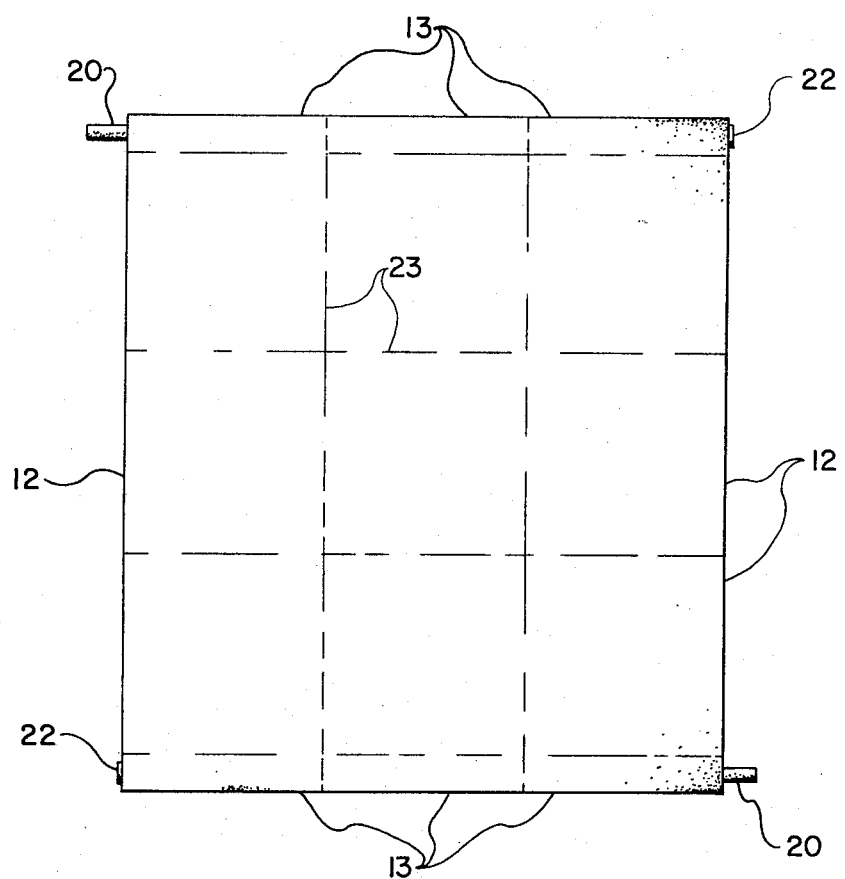
FIG. 6 is a top plan view of the modular collector of the present invention in operative configuration.

When the collector modules 12 and 12' and manifold modules 13 have been assembled into a solar collector as will hereinafter be described in more detail, plugs 22 are provided to close the open end of the outer manifold module 13 as can be seen clearly in FIGS. 1 and 6.

As to the module assembly, they can either be formed, fired and glazed before assembly into the collector 11 or in many instances it may be preferable to coat the modules with a glazed material after firing and then assemble the same and refire them. In the latter procedure, refiring the glaze material will bond the collector modules together along fuse point 23 into a permanent, one piece structure.

If the former method is used wherein modules are assembled into the larger structure without refiring, such as on site installation, any of numerous well known adhesive such as epoxy cement can be used.

Referring more specifically to the forming of the modules, they can be either casted, extruded, or made by press molding the tops and bottoms separately and placing them together before firing. In any case, the integral tubes formed in each of the collector modules will effectively be disposed within what is known as the absorber plate portion of the collector when in use.

The bodies of the modules themselves can be formed from either earthenware, stoneware, porcelain or glass composition as the basic ceramic material.

A steatite or talc body normally called a cordierite body with approximately 50 percent talc ($3MgO.4SiO_2.H_2O$) provides a dense, tough and strong low loss body of high elasticity which can economically be manufactured to close tolerances in complicated shapes. This material manufactured from a magnesium oxide alumina silica system also has a good thermal shock resistance which is necessary in collectors of the type provided by the present invention.

Also a lithium carbonate ($Li_2CO_3$) body of either pure or in mineral form of Petalite or Spodumene has good thermal shock resistance. This last mentioned body is more commonly known as lithium alumina silica clay system.

A third type of material for forming the bodies of the modules is a glass melt composition derived from the lithium-magnesium-alumina-silica ($Li_2O$—$MgO$—$Al_2O_3$—$SiO_2$) field. Titanium dioxide ($TiO_2$), Zirconium Oxide ($ZrO_2$), and Phosphorus Pentoxide ($P_2O_5$) individually or in combination can be added to promote crystallization. In the process using this latter material, the glass module containing the nucleating agents is cooled and subsequently heat treated to form a fine grain glass-ceramic having properties of high strength, low expansion, high thermal stability and chemical inherence. One of the major advantages in using this glass-ceramic composition rather than other types of ceramic is its adaptability to use in conjunction with highly developed, large tonage, high speed processing devices and techniques of the glass industry. Although the final product produced is still a ceramic material, the properties of the final product are superior to the conventional ceramic materials that can be used for the solar collector.

Typically ceramic materials are very poor thermal conductors and in fact are widely used in many industries as insulators. Conductive properties, however, can be imparted to ceramic materials by the addition of graphite. The thermal conductivity of graphite is 0.315 cal/cm/sec/C. The graphite does not react with the ceramic material and can be added to any of the materials mentioned above.

Beryllium Oxide (BeO) or Beryllium compounds are excellent thermal conductors and can be used in the ceramic body to impart this property. Beryllium compounds, however, are toxic and their use will have to be limited to applications where the working fluid is recycled in a closed system. In both agricultural and industrial solar energy uses, this toxicity very well in many instances could be of no great concern.

Once the properties of the basic materials have been selected and the module bodies formed, the same will receive a glaze coat. This glaze is defined as a thin glass coating that is fused to the ceramic ware by high heat.

Generally, the glaze would be transparent to allow light energy to pass therethrough, but as the collector body increases in temperature, the glaze would retard re-radiation in the infrared region. A black or opaque glaze can be used and a black color would be added to this coating. If, of course, the transparent glaze is used, the body would be either black or of a color which would absorb a majority of the visual light energy. This can be accomplished by either using a black stain on the body or by using a stain or colorant in the body itself. Glazes and stains are selected, of course, which give the highest absorption to emission ratio.

While the side or surface 14' of the collector modules facing the sun is considered the absorber plate portion of the collector, the side facing away from the sun should be insulated. Although conventional insulating materials such as glass fibers or the like can be used, a ceramic foam insulation 24 is best suited for use in conjunction with the present invention. This is normally formed by adding quantities of Borax, Manganese, or Antimoney to the glaze which, during firing, causes the glass to foam. The glass foam thus formed is an effective insulator since each bubble is either at a low pressure or vacuum due to the fact that it was formed at high temperature.

The ceramic foam insulation is preferably formed into blocks the same size as the collector modules and is attached to the back of each such module during initial firing. The edges of the solar collector 11 would also have the same type of insulating foam covering the same. This, of course, would include the edges of the header modules as well as the collector modules.

As hereinabove mentioned, when the modules of the present invention have been formed, fired, coated with glaze material, assembled and refired, the individual modules will form a monolithic structure. If desired, a support frame can be provided for the completed solar collector. Also, if desired, a glass or other transparent covering can be provided in spaced relation to the absorber plate side of the solar collector as is commonly done with metal and other types of collectors.

In view of the above, it is obvious that the present invention has the advantage of providing a relatively inexpensive and yet highly efficient solar energy collector which can be modularly produced to form varying shapes and sizes of collector units. The present invention also has the advantage of providing a weather resistant collector which will have an exceedingly long operational life.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning of the equivalency range of the appended Claims are intended to be embraced therein.

What is claimed is:

1. A solar collector type energy conversion device comprising:
    a plurality of interconnecting absorber modules, each absorber module comprised of an absorber body formed from a fired ceramic material that includes a thermal conductive material additive which increases the thermal conductive value of the absorber body, said absorber body including a plurality of channel like openings formed lengthwise therein from one end thereof to the other end thereof and adapted to continuously pass a transfer fluid therethrough, said openings being disposed generally parallel to an absorber surface of said absorber body, said body having mating configuration means at said ends for mating with an adjacent modular part of said device with said corresponding openings in respective, mutual fluid communication, said plurality of modules arranged in a matrix such that a plurality of modules are located end-to-end in said mutual fluid communication to form a subassembly having an opening at each end thereof and such that said subassemblies are in mutual contacting side-by-side relationship;
    manifold means operatively associated in fluid communication with said end openings of said subassemblies such that when the absorber surface of each of the absorber bodies is exposed to the solar source of energy, the same will be transferred into the openings where the transfer fluid can be continuously passed through said device to absorb and carry away the energy so transmitted;
    a fired, ceramic foam insulation bottom juxtaposed to that side of each said absorber body that is opposite said absorber surface thereof, said bottom generally corresponding in shape to said absorber body;
    a fired, ceramic foam insulation bottom juxtaposed to the bottom side of said manifold means; and
    means for integrally connecting together each of said absorber modules, each said manifold means, each of said absorber body bottoms and each of said bottoms of said manifold means into a monolithic structure.

2. The device of claim 1 wherein the fired ceramic material is selected from the group consisting of earthenware, stoneware, porcelain and a glass-ceramic material.

3. The device of claim 1 wherein said absorber body is manufactured from a system selected from the group consisting of a magnesium oxide alumina silica system, a lithium alumina silica clay system, and a glass melt composition derived from the lithium magnesium alumina silica field.

4. The device of claim 1 wherein said thermal conductive material is selected from the group consisting of graphite, beryllium oxide, and beryllium compounds.

5. The device of claim 1 wherein said absorber body is of a dark color which absorbs a majority of the visual light energy and wherein said color is provided by a substance selected from the group consisting of a dark colored glaze, a dark colorant added to said ceramic material before it is fired, and a dark colorant stain applied to said absorber body after it is fired.

6. The device of claim 1 wherein said connecting means is a glaze material that is applied to fired, assembled absorber modules, manifold means, absorber body bottoms and bottoms of said manifold means that are then refined.

7. The device of claim 1 wherein said connecting means comprises an adhesive.

* * * * *